United States Patent
Maurer (10) Patent No.: US 10,110,589 B2
(45) Date of Patent: Oct. 23, 2018

(54) SYSTEMS AND METHODS FOR TASK ACCESS BEHAVIOR BASED SITE SECURITY

(71) Applicant: SECUREWORKS CORP., Wilmington, DE (US)

(72) Inventor: Steven Douglas Maurer, Aloha, OR (US)

(73) Assignee: SECUREWORKS CORP., Wilmington, DE (US)

( * ) Notice: Subject to any disclaimer, the term of this patent is extended or adjusted under 35 U.S.C. 154(b) by 291 days.

(21) Appl. No.: 15/204,775

(22) Filed: Jul. 7, 2016

(65) Prior Publication Data

US 2018/0013750 A1    Jan. 11, 2018

(51) Int. Cl.
*H04L 29/06* (2006.01)
*G06F 17/30* (2006.01)

(52) U.S. Cl.
CPC ...... *H04L 63/0815* (2013.01); *H04L 63/1433* (2013.01)

(58) Field of Classification Search
USPC .......................................................... 726/8
See application file for complete search history.

(56) References Cited

U.S. PATENT DOCUMENTS

| | | | |
|---|---|---|---|
| 7,594,270 | B2 | 9/2009 | Church et al. |
| 8,079,081 | B1 | 12/2011 | Lavrick et al. |
| 8,156,553 | B1 | 4/2012 | Church et al. |
| 8,407,335 | B1 | 3/2013 | Church et al. |
| 8,578,393 | B1 | 11/2013 | Fisher et al. |
| 8,621,554 | B1 | 12/2013 | Yu et al. |
| 8,850,263 | B1 | 9/2014 | Yourtee et al. |
| 9,710,659 | B2* | 7/2017 | Ackerly ............ G06F 21/602 |
| 9,830,469 | B1* | 11/2017 | Anderson ......... G06F 21/6218 |
| 2006/0026687 | A1* | 2/2006 | Peikari ............. G06F 21/562 726/24 |
| 2007/0169194 | A1 | 7/2007 | Church et al. |
| 2010/0312842 | A1 | 12/2010 | Ladouceur et al. |
| 2014/0259145 | A1 | 9/2014 | Khandelwal et al. |

\* cited by examiner

*Primary Examiner* — Fatoumata Traore
(74) *Attorney, Agent, or Firm* — Larson Newman, LLP (57) ABSTRACT

A method for task access behavior based site security includes recording file accesses by an application and user during operation; automatically generating a permissions record indicating allowable access to files by the application and user based on the recorded file accesses; intercepting a file access request; comparing the file access request to a permissions record; and blocking access to the file when the file access is not included in the permissions record.

18 Claims, 4 Drawing Sheets

SYSTEMS AND METHODS FOR TASK ACCESS BEHAVIOR BASED SITE SECURITY

FIELD OF THE DISCLOSURE

The present disclosure generally relates to information handling systems, and more particularly relates to task access behavior based site security.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A method for task access behavior based site security can include recording file accesses by an application and user during operation; automatically generating a permissions record indicating allowable access to files by the application and user based on the recorded file accesses; intercepting a file access request; comparing the file access request to a permissions record; and blocking access to the file when the file access is not included in the permissions record.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
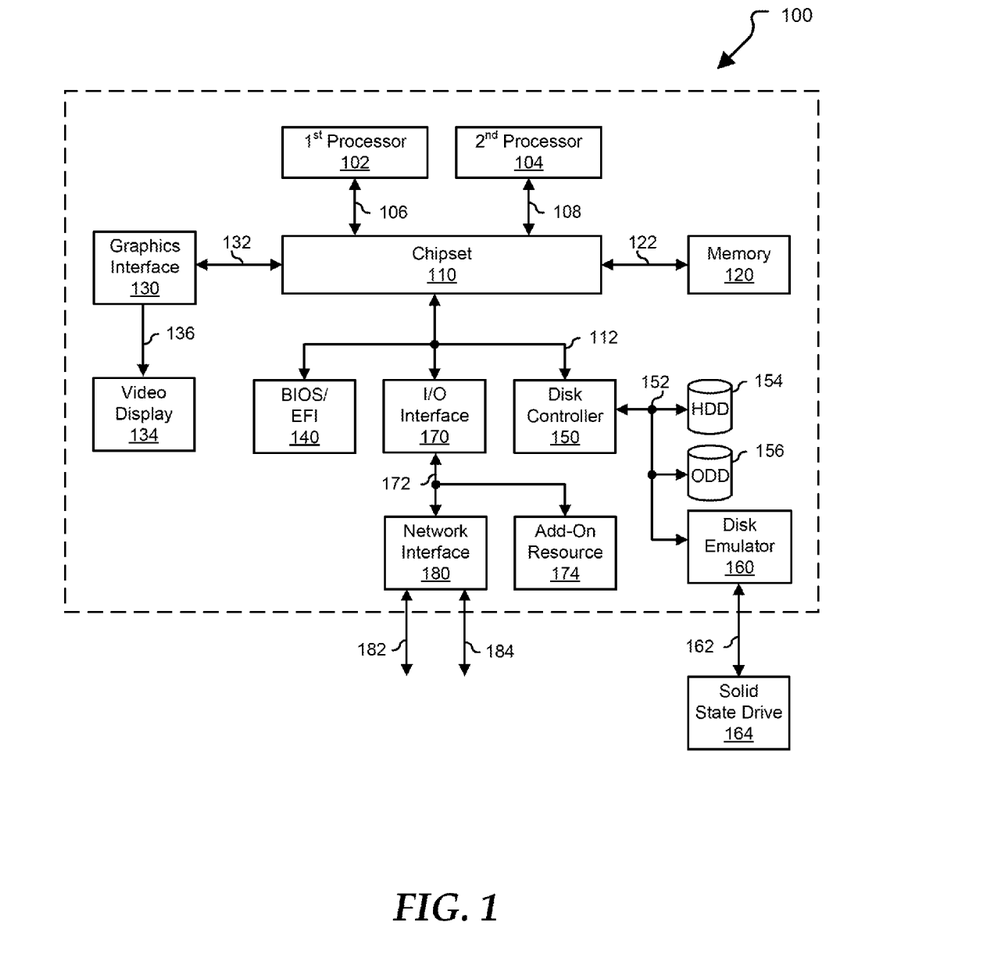
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Task Access Behavior Based Security

The complexity of information handling systems can make them vulnerable to malicious activities. Network connected devices can be attacked remotely. Operating systems and software packages can include security flaws that leave them vulnerable to exploitation. Authorized users can be tricked into revealing access codes or running malicious software. Significant effort is expended in trying to secure systems from malicious activity, including training authorized users, identifying and patching security flaws in the software, and hardening network connections through the use of firewalls and the like. However, even with all these efforts, information handling systems continue to be exploited, due to lapses in user training, exploitation of unidentified or unpatched security flaws, and the like.

Limiting activities that are outside of the normal operations can further reduce the risk of compromise. Various access control mechanisms have been used to prevent users from performing activities they should not be able to perform. These access control mechanisms can include role-based, rule-based, identity-based mechanisms, and can include mandatory access controls and discretionary access controls. However, these control mechanisms operate with the presumption that if a user has permission to perform an activity (such as overwriting a file), than the user should be able to perform the activity using any program available to them. Thus, a threat-actor who manages to penetrate a single program running under the authority of a user can misuse the inherited authority to perform actions inconsistent with the normal operations of the application or user. For example, malicious code embedded in an email can cause an email program to perform actions with the authority of the user that are not normal function of the email program, such as rewriting configuration files or installing malicious code.

More recently, in response to privacy invasions by applications, such as those running on smart phones and other mobile devices, security systems have started limit the access for individual applications. For example, on application running on a smart phone may require user permission prior to accessing location information. However, this type of security system is based on manual approval of access by the user, and is unsuitable for use in data centers where thousands of machines and tens of thousands of application instances may be running. Additionally, with repeated manual approval, there is a tendency of users to just accept requests.

Figure 2:
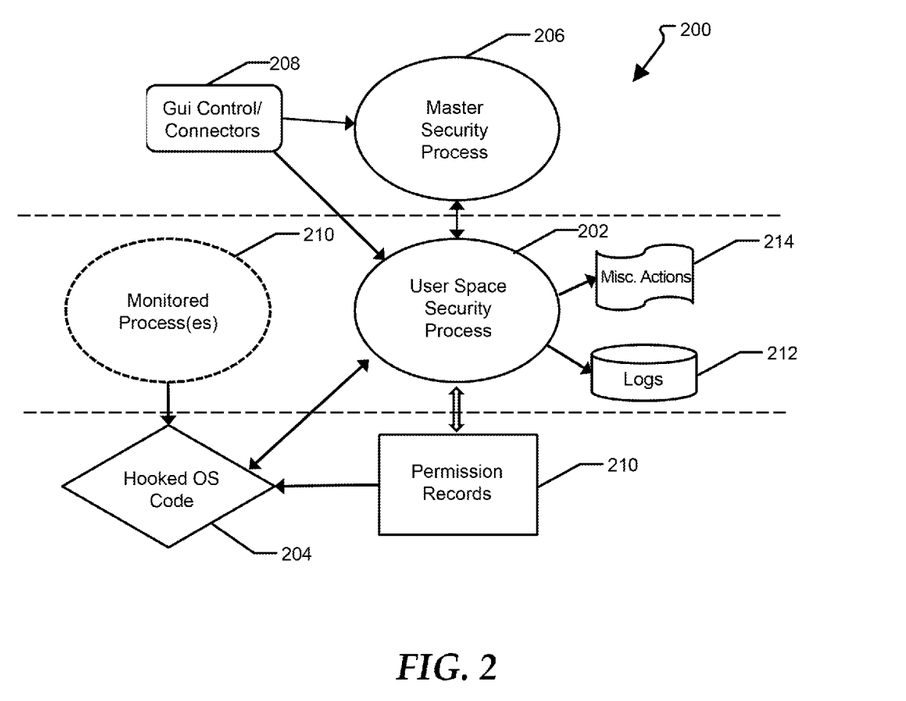
FIGS. 2 and 3 are block diagram illustrating systems for task access behavior based security, in accordance with various embodiments.

FIG. 2 illustrates a system 200 for providing task access behavior based site security. The system 200 includes a user space security process 202, hooked OS code 204, a master security process 206, and a GUI control or connectors 208. In various embodiments, the user space security process 202 can monitor file access by monitored processes 210 through the hooked OS code 204. The user space security process 202 can characterize normal operations and determine a set of permission records 210.

The user space security process 202 can compare a file access request to the permission records 210 to determine if the file access request is normal (consistent with normal operations for the application and user). The user space security process 202 can maintain logs 212 of any abnormal file access. In addition to preventing file access, the user space security process 202 can perform various actions 214 in response to an attempted file access, such as triggering a software update, monitoring unusual user activity, notifying a system administrator or network administrator of unusual activity, and the like. In various embodiments, the user space security process 202 can monitor the context of a file access request and determine if the file access is granted based on the preceding file access requests. For example, access to a financial database may require access of an auditing module immediately prior to accessing the financial database.

The hooked OS code 204 can include hooks into the OS file access routines that insert additional steps into the process by which the OS grants file access. For example, when an applications sends a request to the OS to access a file, the hooked OS code 204 can intercept the request. In various embodiments, the hooked OS code 204 can determine, based on the permissions records 210, if the file access is allowed. Alternatively, the hooked OS code 204 can suspend the requesting application and switch the context to the user space security process 202 to make the determination. This can enable a more complex determination than can be performed by the hooked OS code 204 alone.

The master security process 206 can direct the user space security process 202 remotely. In various embodiments, the master security process 206 can interact with a system or network administrator or security specialists through the graphical user interface (GUI) of the GUI Control/Connectors 208. Additionally, the GUI Control/Connectors 208 can provide connections to various networked directories, such as Active Directory, OpenLDAP, Quest, or the like that enable management of users and devices across a network. The connections to the networked directories can provide a mechanism for the master security process 206 and user space security process 202 to identify a user and determine what level of access the user has.

Figure 3:
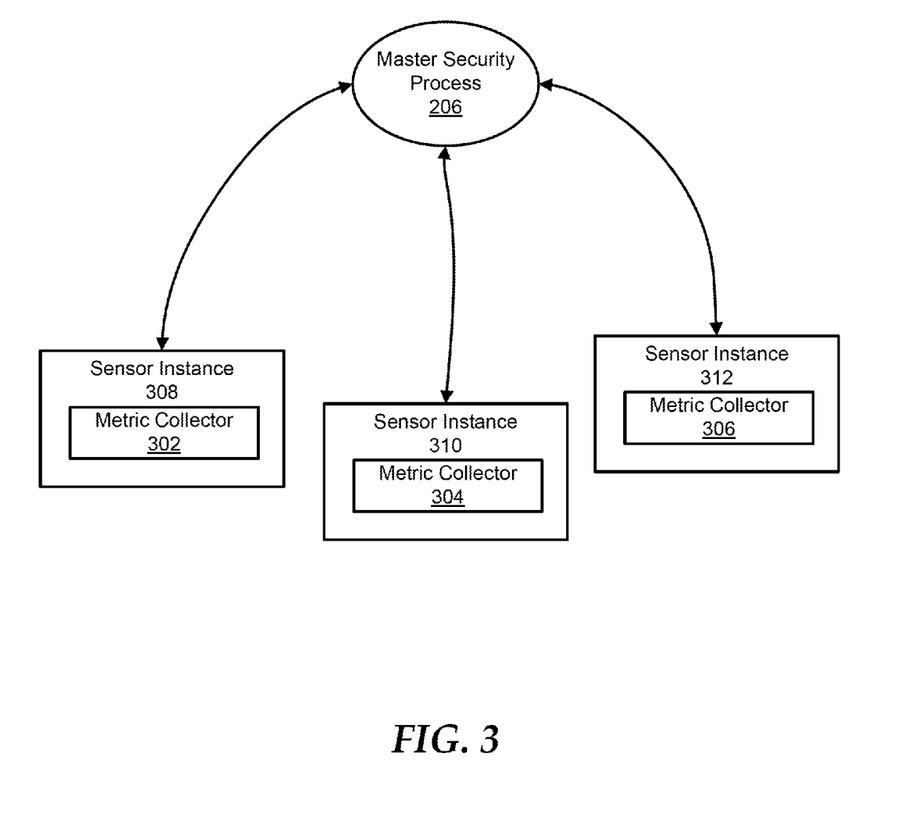

FIG. 3 illustrates the use of a system for providing task access behavior based site security across a plurality of computing devices. Master security process 206 can interact with user space security processes 302, 304, and 306 from a plurality of networked devices 308, 310, and 312 within a network or data center. In various embodiments, the master security process 206 can coordinate access control across the networked devices 308, 310, and 312. In one example, at least portions of permissions records can be cloned from networked device 308 to networked device 312, such as when networked device 312 provides load sharing or failover for networked device 308. Additionally, user space security processes 302, 304, and 306 can notify the master security process 206 of denied attempts to access files. In various embodiments, the alerts of denied attempts to access files can be merged site system wide to provide a high level picture of intrusion attempts.

Figure 4:
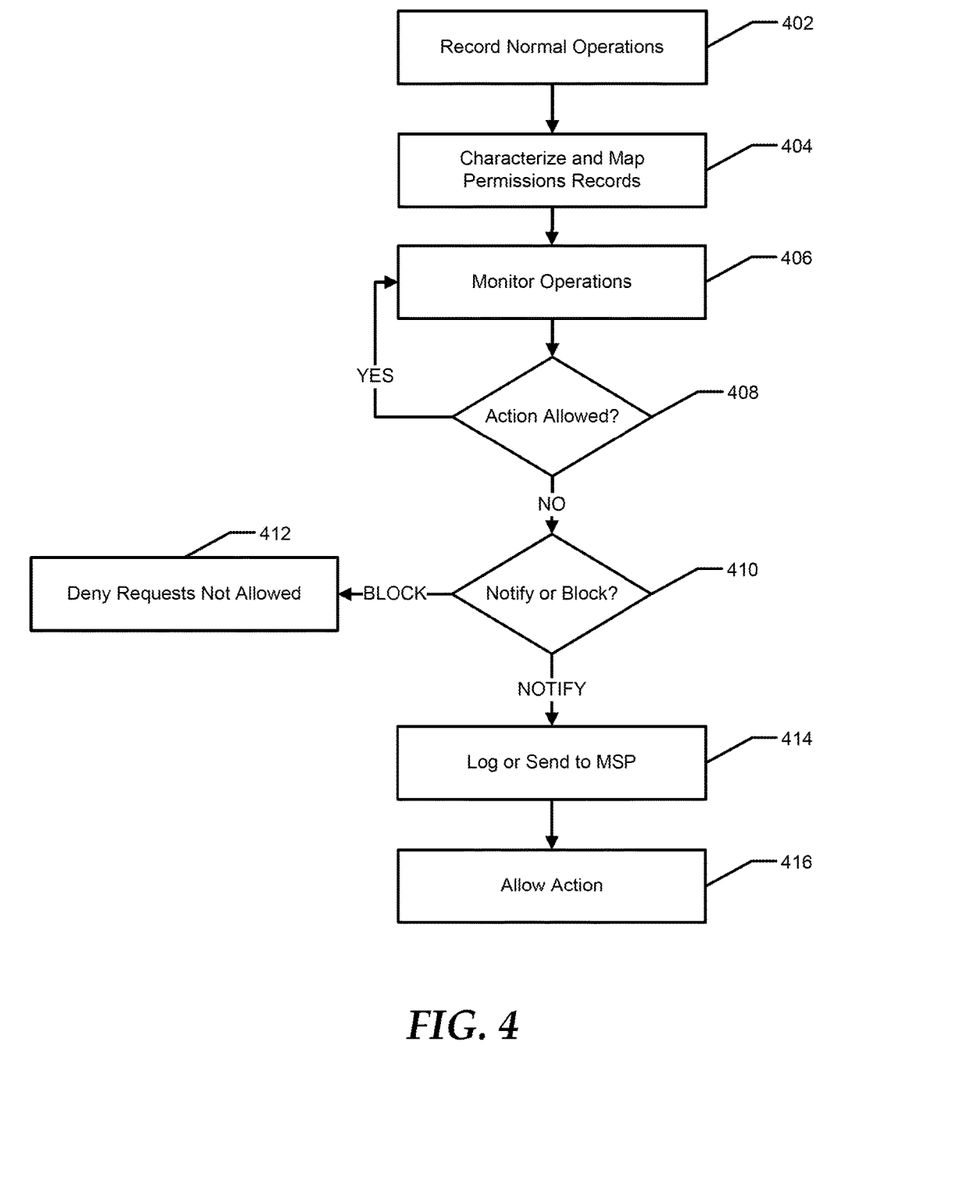
FIG. 4 is a flow diagram illustrating a method for task access behavior based security, in accordance with various embodiments.

FIG. 4 shows a method for providing task access behavior based site security. At 402, the user space security process can record normal operations. This can include identifying which files and directories an application typically accesses, such as a web server accessing files in the website directory. Additionally, the user space security process can identify which applications a service or user may routinely access.

At 404, the user space security process can characterize and map permissions records based on the observed normal activity. For example, the user space security process can include permissions for a web server application to read files in the website directory. Additionally, the web server application may be granted write permissions for some files, such as temporary or log files.

At 406, the user space security process can monitor ongoing operations of the system and identify file access attempts. At 408, the user space security process can determine if the file access attempt should be allowed. When the file access attempt is allowed based on the permissions records, the user space security process can return to 406 and continue to monitor operations.

Alternatively, when the file access attempt is not allowed by the permissions records, the user space security process can determine if the action should be blocked or if the action should be logged and allowed (notify), as indicated at 410. When the permissions records indicate the access should be block, the user space security process can deny access to the file, as indicated at 412.

Alternatively, when the file access should be logged and allowed, the user space security process can log the file access, as indicated at 414. Additionally, the user space security process can notify the master security process of the file access. At 416, the file access can be allowed.

In various embodiments, the system can operate in a record and lockdown mode. Once permissions records have been built, either based on observation of the normal operation of the system or by modification of permissions records by a security expert, any file access that is not listed in the permissions records can be denied. Additionally, the attempt may be logged. In other embodiment, the system can operate in a monitoring mode and attempts to access files not included in the permissions records can be logged and allowed. In some instances, the system can operate in a hybrid mode logging and allowing access to some files but blocking others. For example, access to certain directories and files can be blocked, while access to other directories and files can be logged. In another example, abnormal file access by a set of users or a set of applications can be logged, while abnormal access by other users or applications can be blocked.

In various embodiments, when a software update is available, the user space security process can perform additional steps. For example, the user space security process can force a software update when an application file is accessed and a new version is available. This can limit software updates to only systems in which the application is used. Additionally, when an application is upgraded, permissions records for the new version of the application can be provided. In another example, the user space security process can update permissions records when the updated application is accessed. The permissions records update can, for example, remove all file access by the previous version of the application, ensuring that only the updated versions can operate.

In various embodiments, the user space security process can utilize role-based permissions for an account. For example, an account normally used to run an application or webserver may occasionally have users log into the account to perform general maintenance. The user space security process can identify the invocation of a shell or a GUI as the abnormal for the application or webserver and can allow but monitor and log file access by the shell or GUI.

In various embodiments, the user space security process can perform access sequence based security, limiting access to certain files unless other files have been accessed immediately prior.

In various embodiments, the user space security process can restrict access by vulnerable applications. Zero day exploits can be identified prior to a patch or fix being available. It can often take several days or weeks for a patch to be made available to correct to security flaw. In certain environments, it may not be feasible to disable the application while awaiting for a patch to correct the vulnerability. The user space security process can be configured to monitor the application's file access for signs of malware exploitation, and notify an administrator of exploitation. This can allow the application to continue operation with a level of assurance it is not compromised, until a patch is available. If the user space security process detects signs of malware exploitation, the administrator can take steps to remove the exploitation, such as by reinstalling the software or rolling back to a known good image of the system.

In various embodiments, the user space security process can monitor for social engineering or disgruntled users. User activities, as opposed to server functions, can be easily distinguished by having records for programs that take user input and perform system actions, such as shells, windows-explorer, cmd, mail executables, and the like. The user space security process can disallow execution of unknown programs from a mail program or shell so that attempts to trick a user into downloading an executing malware can be blocked and logged.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for task access behavior based site security, comprising:
   characterizing and mapping files accesses by an application and user during operation;
   automatically generating a permissions record indicating allowable access to files and directories by the application and user based on the recorded file accesses;
   comparing the file access request to a permissions record;

reporting file access requests by an application identified as having an unpatched vulnerability to a master process, wherein the characterizing, the mapping, the generating, the comparing and the reporting are performed by the user space security process; and intercepting, a file access request;

suspending a request process and activating the user security process:

allowing or denying the file access process request based on the determining by the user space security process, wherein the intercepting, the suspending, the allowing or denying are performed by the hooked OS code;

notifying the user space security processes of an application having an unpatched vulnerability; and analyzing the files access request to determine if the identified application is compromised, wherein the notifying and the analyzing are performed by the master security process.

2. The method of claim 1, further comprising generating a log of the attempted file access.

3. The method of claim 1, wherein comparing the file access request to the permissions record includes evaluating recently accessed files by the application or user to determine if a required sequence of file access is satisfied.

4. The method of claim 1, wherein the file access request is a request to access a file marked for upgrade or by an application marked for upgrade; and the method further includes triggering an upgrade of the file or application.

5. The method of claim 1, further comprising logging file access requests associated with a user logging into an account usually associated with a server process.

6. The method of claim 1, further comprising disallowing execution of an unknown executable from within a mail program.

7. A system for task access behavior based site security, comprising:
a memory; and
a processor executing a user space security process configured to:
characterize and map file access by application and user;
generate a permissions record indicating files or directories allowed to be accessed by application and user;
when file access is requested, compare the request to the permissions record and determine if the file access is allowed; and
report file access requests by an application identified as having an unpatched vulnerability to a master security process; and
hooked OS code when operated configured to:
intercept a file access request;
suspend a requesting process and activate the user space security process; and
allow or deny the file access request based on the determination by the user space security process;
the master security process configured to:
notify the user space security processes of an application having an unpatched vulnerability; and
analyze the file access requests to determine if the identified application is compromised.

8. The system of claim 7, wherein the user space security process is further configured to log file access requests that are blocked.

9. The system of claim 7, wherein the user space security process is further configured to evaluate recently accessed files by the application or user to determine if a required sequence of file access is satisfied.

10. The system of claim 7, wherein the file access request is a request to access a file marked for upgrade or by an application marked for upgrade; and the user space security process is further configured to trigger an upgrade of the file or application.

11. The system of claim 7, wherein the user space security process is further configured to log file access requests by an application identified as having an unpatched vulnerability; and to analyze the file access requests to determine if the identified application is compromised.

12. The system of claim 7, wherein the user space security process is further configured to log file access requests associated with a user logging into an account usually associated with a server process.

13. The system of claim 7, wherein the user space security process is further configured to disallow execution of an unknown executable from within a mail program.

14. A system For task access behavior based site security, comprising:
a plurality of computer systems each including:
a user space security process configured to:
characterize and map file access by application and user;
generate a permissions record indicating files or directories allowed to be accessed by application and user; and
report file access requests by an application identified as having an unpatched vulnerability to a master security process; and
when file access is requested, compare the request to the permissions record and determine if the file access is allowed; and
notify a master security process when a file access is denied;
hooked OS code when operated configured to:
intercept a file access request;
suspend a requesting process and activate the user space security process; and
allow or deny the file access request based on the determination by the user space security process; and
the master security process configured to:
receive denied access attempt notifications from the user space security processes;
notify the user space security processes of an application having an unpatched vulnerability; and
analyze the file access requests to determine if the identified application is compromised.

15. The system of claim 14, wherein the user space security process is further configured to communicate file access requests that are blocked to the master security process.

16. The system of claim 14, wherein the master security process is further configured to communicate permissions records between user space security processes.

17. The system of claim 14, wherein the user space security process is further configured to evaluate recently accessed files by the application or user to determine if a required sequence of file access is satisfied.

18. The system of claim 14, wherein the master security process is further configured to notify the user space security processes of an application or file marked for upgrade; and the user space security process is further configured to trigger an upgrade of the file or application when a file access request for a file marked for upgrade or by an application marked for upgrade is received.

\* \* \* \* \*